United States Patent [19]

Behar et al.

[11] 4,078,584

[45] * Mar. 14, 1978

[54] PIPE SYSTEM FOR COLLECTING PETROLEUM FROM OFF-SHORE WELLS LOCATED AT GREAT DEPTHS

[75] Inventors: Isaac Behar, Paris; Maurice Génini, Creteil, both of France

[73] Assignee: Coflexip, Rueil-Malmaison, France

[ * ] Notice: The portion of the term of this patent subsequent to Oct. 14, 1992, has been disclaimed.

[21] Appl. No.: 614,939

[22] Filed: Sep. 19, 1975

[51] Int. Cl.² .................. E02D 23/00; F16L 3/00; F16L 9/00
[52] U.S. Cl. .................................. 138/107; 9/8.5; 61/81; 138/178
[58] Field of Search ............... 138/178, 107, 177, 103; 61/81, 46.5; 9/8 P, 8.5

[56] References Cited

U.S. PATENT DOCUMENTS

| | | | |
|---|---|---|---|
| 2,383,840 | 8/1945 | Benekert | 138/103 X |
| 3,173,451 | 3/1965 | Slayter | 138/111 |
| 3,572,043 | 3/1971 | Clara | 9/8 P |
| 3,641,602 | 2/1972 | Flory et al. | 9/8 P |
| 3,708,811 | 1/1973 | Flory | 9/8 P |
| 3,911,688 | 10/1975 | Behar et al. | 61/72.3 |

*Primary Examiner*—Steven L. Stephan
*Attorney, Agent, or Firm*—Brisebois & Kruger

[57] ABSTRACT

Pipe system for collecting petroleum from off-shore wells located at great depths comprises flexible pipes connecting well head to a float comprising an at least partially submerged caisson which contains air so as to maintain the flexible pipes under tension. Rigid pipes within the caisson lead from the flexible pipes to a discharge opening in a superstructure which projects above the surface of the sea.

1 Claim, 1 Drawing Figure

U.S. Patent     March 14, 1978     4,078,584
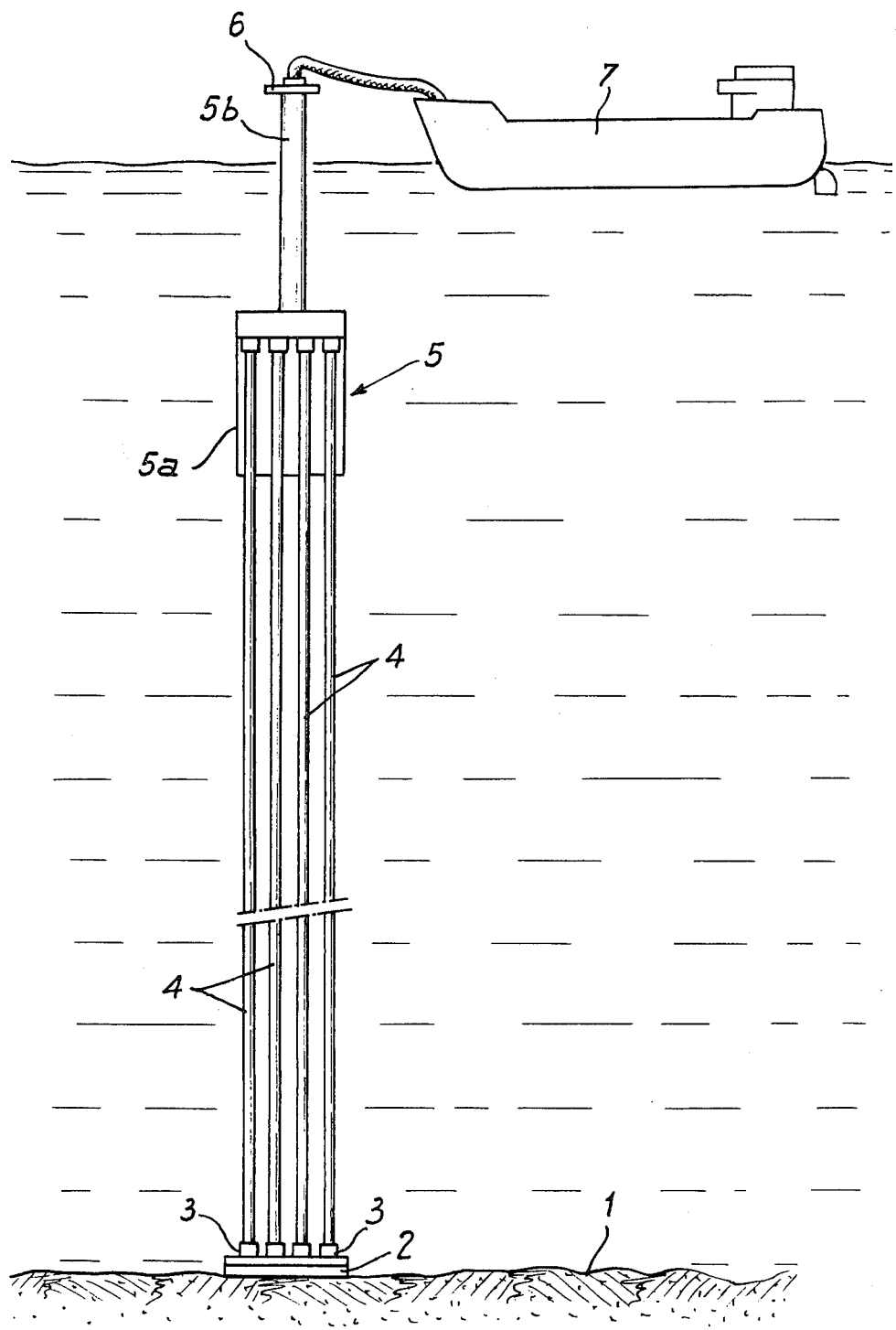

PIPE SYSTEM FOR COLLECTING PETROLEUM FROM OFF-SHORE WELLS LOCATED AT GREAT DEPTHS

This invention relates to a new pipe system for collecting hydrocarbon products from wells located at great depths.

It is well known that it is more and more frequently necessary to extract petroleum from strata which are located at the bottom of the sea. While, up until recently, the oil fields thus exploited have been relatively close to the shore, and the depth of the water was several dozens of meters, petroleum extraction is now carried out at substantial distances from the shore and at a depth of several hundreds meters, for example, 500 hundred meters and greater.

Applicants have already described in their U.S. patent application Ser. No. 395,837, now U.S. Pat. No. 3,911,688, a pipe system for the collecton of petroleum from wells located in deep water, which device comprises a float immersed beneath the zone of the sea which is effected by the surface swell and which exerts a traction on the flexible pipes connected to a base at the head of the well. These pipes are connected at the level of the float to flexible pipes which are not under tension and lead to the surface of the water.

While such a system represents a substantial improvement over the prior art, it does have the disadvantage that the flexible pipes connecting the immersed float to the surface are subjected to substantial wear because of the swell and waves at the surface.

The present invention relates to an improved pipe system intended to connect the submarine well head to a floating permanent naval support, such as a barge or tanker, which carries equipment for separating, and possibly temporarily storing petroleum, and from which the petroleum is delivered to tankers.

It is the object of the present invention to provide a pipe system for the collection of petroleum produced from a heavy base located on the ocean floor and incorporating one or more well heads or a collector, said device comprising a semi-submersible caisson consisting of a substantially cylindrical body vertically immersed beneath the surface of the sea, and an upper part having a smaller section than the cylindrical body, said upper part emerging sufficiently above the agitated surface of the water; a group of flexible pipes positioned between the caisson and the base, said pipes being kept in tension by the caisson in a position spaced from each other, and means in said caisson for connecting said flexible pipes to at least one discharge opening located at the top of the caisson, which is located above the water.

The flexible tubes according to the invention are, for example, of the type comprising a steel reinforcement designed to ensure the mechanical strength of the pipe by permitting its deformation, and at least one insulating sheath.

In accordance with the invention, the semi-submersible caisson must have sufficent bouyancy to ensure the exertion of vertical traction on the flexible pipes so that the latter are always kept under tension. The caisson may advantagesouly comprise balancing means for adapting the bouyancy to the exigencies of use.

The flexible tubes may be advantageously mounted on the caisson by means of collars or conventional attaching means.

At their upper ends the flexible pipes are connected to one or more preferably rigid pipes inside the upper part of the caisson, and these pipes emerge at at least one orifice at the top of the caisson located above the surface of the water to permit the removal of hydrocarbons to the floating naval support.

Other advantages and characteristics of the invention will appear in the light of the following description with reference to the accompanying drawing which shows a schematic elevational view of the pipe system according to the invention.

FIG. 1 very schematically illustrates the structure of the system according to the invention. At the lower part of this figure is shown the ocean floor 1, on which rests the base 2, combining one or more well heads or a collector. At their lower ends the flexible pipes according to the invention are provided with automatic connecting means 3, for connecting them to the base 2. The device 3, of a known type, make it possible to individually replace the flexible pipes and thus maintain the system in operating condition.

The group of flexible pipes 4, which may be of any number, extends from the base of the semi-submersible caisson 5.

This caisson 5 comprises a hollow body 5a which is entirely immersed, of cylindrical shape, and of substantial volume, together with an upper part 5b having a smaller section than that of the cylindrical part 5a, which emerges above the surface of the water. The reduced section of the part 5b as compared with that of the part 5a is intended to reduce the pounding effect to which the caisson 5 is subjected by the waves and swells at the surface.

The body 5a is wholly or partially filled with air so that it tends to rise in the water and thus applies tension to the flexible pipes 4.

In the embodiment illustrated on the drawing, the flexible pipes are connected near the top of the body 5a of the caisson but it is clear that they could also be connected to the central or lower part of the body, since any of these points is easily accessible to divers equipped for a slightly deeper dive.

The flexible pipes 4 penetrate into the caisson 5 where they are connected to pipes (not shown), which are preferably rigid, and which permit the petroleum brought in through the flexible pipes 4 to rise to one or more orifices located at the ope of the part 5b which emgerges from the surface of the water.

It is notably advantageous to provide at the upper end of the part 5b a small platform 6 comprising, for example, a rotary joint for connection to the permanent naval support 7. The discharge of the petroleum from the platform 6 to the naval support 7 may take place in any conventional manner, as for instance, through flexible pipes.

By way of example the total traction exterted upwardly by the caisson 5 on the flexible tube 4 may be of the order of one or several hundred tons. Each flexible pipe 4 may be made, for example, in a known manner, of several tubular layers of flexible runner, plastic or cloth provided with helically wound steel wire reinforcements and an inner plastic sheath. Each tube is, for example, subjected by the caisson to a tension of several dozen tons, for example 30 tons, which tension adds to the tension due to the weight of the tube itself.

What is claimed is:

1. Pipe system for the collection of petroleum from a base located at the bottom of the sea, said system comprising a semi-submersible caisson constituted by a substantially cylindrical body vertically immersed beneath the surface of the sea and an upper part having a substantially reduced section as compared with the cylindrical part, said upper part emerging at least partially above the surface of the sea, a group of flexible pipes spaced frm each other and connecting said caisson and said base, and means within said caisson for connecting the flexible pipes to at least one outlet for discharging the petroleum and located above the level of the sea at the upper part of the caisson said caisson comprising bouyancy means for exerting on said flexible pipes a vertical traction force of magnitude sufficient to support the weight of the pipes and to subject them to a tension along their entire lengths.

* * * * *